(12) United States Patent
Gao et al.

(10) Patent No.: US 8,804,380 B2
(45) Date of Patent: Aug. 12, 2014

(54) ZERO STANDBY SWITCHING POWER SUPPLY SOLUTION

(75) Inventors: Xiaoru Gao, Shanghai (CN); Yajiang Zhu, Shanghai (CN); Chao Chen, Shanghai (CN); Meiling Zhang, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 162 days.

(21) Appl. No.: 13/436,779

(22) Filed: Mar. 30, 2012

(65) Prior Publication Data

US 2013/0088898 A1 Apr. 11, 2013

(30) Foreign Application Priority Data

Aug. 29, 2011 (CN) .......................... 2011 1 0251226

(51) Int. Cl.
*H02M 3/335* (2006.01)
*H02M 3/315* (2006.01)
(52) U.S. Cl.
USPC ........................................ 363/21.16; 363/28
(58) Field of Classification Search
USPC ................... 363/21.16, 21.17, 78, 90, 98, 89
See application file for complete search history.

(56) References Cited

U.S. PATENT DOCUMENTS

| | | | |
|---|---|---|---|
| 5,452,195 A | 9/1995 | Lehr et al. | |
| 5,640,317 A | 6/1997 | Lei | |
| 6,404,654 B1 | 6/2002 | Wang | |
| 6,674,271 B2 | 1/2004 | Choo et al. | |
| 6,943,535 B1 | 9/2005 | Schiff | |
| 6,980,442 B2 | 12/2005 | Lv et al. | |
| 7,313,004 B1 | 12/2007 | Yang et al. | |
| 8,125,799 B2 | 2/2012 | Zhu et al. | |
| 2001/0004204 A1 | 6/2001 | Mitsuaki | |
| 2002/0131284 A1* | 9/2002 | Jiang et al. | ...................... 363/98 |
| 2003/0169606 A1 | 9/2003 | Miermans | |
| 2003/0183924 A1 | 10/2003 | Bhalla et al. | |
| 2005/0212501 A1 | 9/2005 | Acatrinei | |
| 2007/0121258 A1 | 5/2007 | Hachiya | |
| 2007/0210772 A1 | 9/2007 | Sawtell | |
| 2008/0310191 A1 | 12/2008 | Zhu et al. | |

(Continued)

OTHER PUBLICATIONS

Chen et al., "*Reduction of Power Supply EMI Emission by Switching Frequency Modulation*," IEEE Power Electronics and Drive System Conference 1993; pp. 127-133.

(Continued)

*Primary Examiner* — Matthew Nguyen
*Assistant Examiner* — Trinh Dang (57) ABSTRACT

A switching mode power supply (SMPS) includes a power transistor coupled to the primary winding of transformer and a resistor coupled between the input power source and a control terminal of the power transistor for triggering a primary current flow through the power transistor for providing startup power. A primary side control circuit is configured to regulate the output of the SMPS. A secondary side control circuit is coupled to the secondary winding and being configured to provide a first electrical signal to the secondary winding when an output voltage of the SMPS is less than a first reference voltage, whereupon an awakening signal is induced in the auxiliary winding and causes the primary side control circuit to provide a turn-on signal to the power transistor. The primary side control circuit is configured to enter a standby mode or a normal operating mode in response to the awakening signal.

20 Claims, 3 Drawing Sheets

(56) References Cited

U.S. PATENT DOCUMENTS

| | | |
|---|---|---|
| 2009/0279333 A1 | 11/2009 | Zhu et al. |
| 2010/0002480 A1* | 1/2010 | Huynh et al. ............... 363/90 |
| 2011/0157936 A1* | 6/2011 | Huynh ......................... 363/78 |

OTHER PUBLICATIONS

Kassakian, John G., et al., "Principles of Power Electronics;" Form and Function: An Overview, Chapter 2, Section 2.2, Jun. 1992, pp. 11-13.

Non-Final Office Action for U.S. Appl. No. 12/136,760, mailed on Apr. 26, 2012, 12 pages.

Non-Final Office Action for U.S. Appl. No. 12/248,665, mailed on Aug. 19, 2011, 13 pages.

Non-Final Office Action for U.S. Appl. No. 12/136,760, mailed on Aug. 4, 2011, 24 pages.

Non-Final Office Action for U.S. Appl. No. 12/605,081, mailed on Apr. 21, 2011, 17 pages.

Non-Final Office Action for U.S. Appl. No. 12/421,461, mailed on Feb. 1, 2011, 23 pages.

Notice of Allowance for U.S. Appl. No. 12/605,081, mailed on Oct. 19, 2011, 9 pages.

Notice of Allowance for U.S. Appl. No. 12/421,461, mailed on Jun. 20, 2011, 7 pages.

Stankovich et al., *"Analysis and Synthesis of Randomized Modulation Schemes for Power Converters,"* IEEE Transactions of Power Electronics, vol. 10, No. 6, Nov. 1995, pp. 680-693.

\* cited by examiner

ZERO STANDBY SWITCHING POWER SUPPLY SOLUTION

CROSS-REFERENCES TO RELATED APPLICATIONS

This application claims priority to Chinese Patent Application No. 201110251226.5, filing date Aug. 29, 2011, commonly assigned, incorporated by reference herein for all purposes.

This application is also related to U.S. patent application Ser. No. 12/605,081, filed Oct. 23, 2009, entitled "CONTROL CIRCUITS AND METHODS FOR SWITCHING MODE POWER SUPPLIES" by inventors Y by inventors Yajiang Zhu et al., Now U.S. Pat. No. 8,125,799, commonly assigned and incorporated by reference herein for all purposes.

BACKGROUND OF THE INVENTION

The present invention is directed to switching mode power supplies (SMPS). More particularly, embodiments of the invention provide circuits and methods for reducing standby power consumption of the SMPS. But it would be recognized that the invention has a much broader range of applicability.

Switching mode power supplies (SMPS) have the advantages of smaller size, higher efficiency and larger output power capability, and are widely applied in mobile phone chargers, notebook computer adapters and other fields. In recent years, green power supplies are emphasized, which require higher conversion efficiency and especially lower standby power consumption. This leads to the continuous reduction of switching frequency in light load or no load conditions of an SMPS, because lower switching frequency in light load or no load conditions can reduce switching loss of power transistor, thus increase power conversion efficiency and reduce system standby power.

Energy saving and environmental protection has become increasingly important. However commonly used in products such as adapter/chargers for shaver, cell/cordless phones, PDAs, MP3, and other portable apparatus, auxiliary power supplies continuously draw power as long as the product is plugged in, resulting in significant standby energy waste. Consumer electronic industry demands urgently for ultra low standby power supplies.

In view of the foregoing, there is a need for improved techniques for achieving low standby energy consumption switch mode power supplies.

BRIEF SUMMARY OF THE INVENTION

In accordance with embodiments of the present invention, a variety of techniques are described for reducing power consumption of the SMPS. Various power consumption functions are identified, and techniques for reducing each component are discussed. For example, the system detects the load condition automatically. When detecting no load condition, the system shuts down most of the circuits and functions in primary side control IC. Thus the primary side control IC consumes ultra low current. And the second side control IC monitors the system output voltage and provides extremely low switching frequency for the system. The union of the primary side control IC and the second side control IC achieve good dynamic performance. Using the power transistor as the startup current amplifier allows the use of a large resistor as the startup resistor and can reduce the power consumption of startup resistor over ten times lower. Through the above methods, the system can achieve zero standby power, and at the same time has good dynamic performance. In addition, in some embodiments, the output voltage can be accurately controlled accurately to within ±5%. The International Electrotechnical Commission (IEC) 62301 test procedure describes a method for testing standby power use in appliances and classifies power use of less than 5 mW as zero standby power. Some embodiments of the invention provide techniques for achieving "zero standby power" according to this particular definition.

According to an embodiment of the invention, a switching mode power supply (SMPS) includes a transformer having a primary winding for coupling to an input power source, a secondary winding for providing an output of the SMPS, and an auxiliary winding. The SMPS has a power transistor coupled to the primary winding and a resistor coupled between the input power source and a control terminal of the power transistor for triggering a primary current flow through the power transistor for providing startup power. The SMPs also includes a primary side control circuit coupled to the auxiliary winding and the power transistor. The primary side control circuit is configured to regulate the output of the SMPS by controlling the power switch in response to a feedback voltage signal that is representative of the output of the SMPS. The SMPs also has a secondary side control circuit coupled to the secondary winding and being configured to provide a first electrical signal to the secondary winding when an output voltage of the SMPS is less than a first reference voltage, whereupon an awakening signal is induced in the auxiliary winding and causes the primary side control circuit to provide a turn-on signal to the power transistor. The primary side control circuit is configured to be in a standby mode under a no-load condition, in which one or more circuit blocks in the primary side control circuit are turned off. And the primary-side control circuit enters into a normal operating mode when two successive awakening signals are received within a predetermined time period.

In an embodiment of the above switching mode power supply, the primary side control circuit includes an awakening signal detector that is configured to operate in the standby mode and is configured to provide the turn-on signal to the power transistor upon receiving the awakening signal. In a specific embodiment, in the standby mode, all circuit blocks in the primary side control circuit are turned off except the awakening signal detector.

In some embodiments of the above SMPS, the primary side control circuit comprises a pulse frequency modulation (PFM) controller. In other embodiments, the primary side control circuit comprises a pulse width modulation (PWM) controller In some other embodiments of the SMPS, the primary side control circuit is configured to operate at a first frequency in the normal operating mode and is configured to operate at a second frequency in the standby mode, wherein the second frequency is lower than the first frequency. In a specific embodiment, the first frequency is approximately 50 KHz and the second frequency is approximately 20 Hz.

In some embodiments of the above SMPS, the secondary side control circuit is configured to control the output voltage by providing the first electrical signal to the secondary winding when the output voltage is less than the first reference voltage and discharging an output capacitor when the output voltage is higher than a second reference voltage.

In some embodiments of the above SMPS, the SMPS further includes an output diode and an output capacitor coupled to the secondary winding and the output terminals of the SMPS. The secondary side control circuit includes a first terminal coupled to a first terminal of the secondary winding, a second terminal coupled to the output capacitor and the output terminal of the SMPS, and a third terminal coupled to a second terminal of the secondary winding. The output diode is coupled between the first and the second terminals of the secondary side control circuit. In a specific embodiment, the secondary control circuit also includes a switching detector circuit coupled to the first terminal for detecting a state of the secondary winding, a trigger circuit coupled to the first terminal for providing the first electrical signal to be received as the awakening signal by the primary side control circuit, an output monitor coupled to the second terminal for monitoring the output of the SMPS, and a discharge circuit for discharging the output capacitor.

In some embodiments of the above SMPS, a system switching frequency is between 10 Hz and 20 Hz in the standby mode. In a specific embodiment, the secondary control circuit is characterized by a power consumption of 0.5 mWatt to 1 mWatt in a switching period. In another specific embodiment, the primary side control circuit is characterized by a standby mode power consumption of not more than 1 mWatt in a switching period. In some embodiments, the SMPS is characterized by a standby mode power consumption of not more than 5 mWatt in a switching period.

In some embodiments, the SMPS includes a buffer circuit with a first terminal coupled to the input voltage source and a second terminal coupled to the primary winding and the power transistor. In a specific embodiment, the buffer circuit also includes a resistor and a capacitor connected in parallel between the input voltage source and a first terminal of the primary winding and a diode coupled between the parallelly-connected resistor and capacitor and a second terminal of the primary winding.

According to another embodiment of the invention, a switching mode power supply (SMPS) includes a transformer having a primary winding for coupling to an input power source, a secondary winding for providing an output of the SMPS, and an auxiliary winding. The SMPS has a power transistor coupled to the primary winding and a resistor coupled between the input power source and a control terminal of the power transistor for triggering a primary current flow through the power transistor for providing startup power. The SMPs also includes a primary side control circuit coupled to the auxiliary winding and the power transistor. The primary side control circuit is configured to regulate the output of the SMPS by controlling the power switch in response to a feedback voltage signal that is representative of an output of the SMPS. The SMPs also has a secondary side control circuit coupled to the secondary winding and being configured to provide a first electrical signal to the secondary winding when an output voltage of the SMPS is less than a first reference voltage, whereupon an awakening signal is induced in the auxiliary winding and causes the primary side control circuit to provide a turn-on signal to the power transistor.

In an embodiment of the above SMPS, the primary side control circuit is configured to enter into a standby mode under a no-load condition, in which one or more circuit blocks in the primary side control circuit are turned off. And the primary-side control circuit enters into a normal operating mode when two successive awakening signals are received within a predetermined time period.

In another embodiment of the above SMPS, the primary side control circuit comprises an awakening signal detector that is configured to operate in the standby mode and is configured to provide the turn-on signal to the power transistor upon receiving the awakening signal. In a specific embodiment, in the standby mode, all circuit blocks in the primary side control circuit are turned off except the awakening signal detector.

In another embodiment of the above SMPS, the secondary side control circuit is configured to control the output voltage by providing the first electrical signal to the secondary winding when the output voltage is less than the first reference voltage and discharging an output capacitor when the output voltage is higher than a second reference voltage.

Various additional embodiments, features, and advantages of the present invention can be appreciated with reference to the detailed description and accompanying drawings that follow.

DETAILED DESCRIPTION OF THE INVENTION

Figure 1:
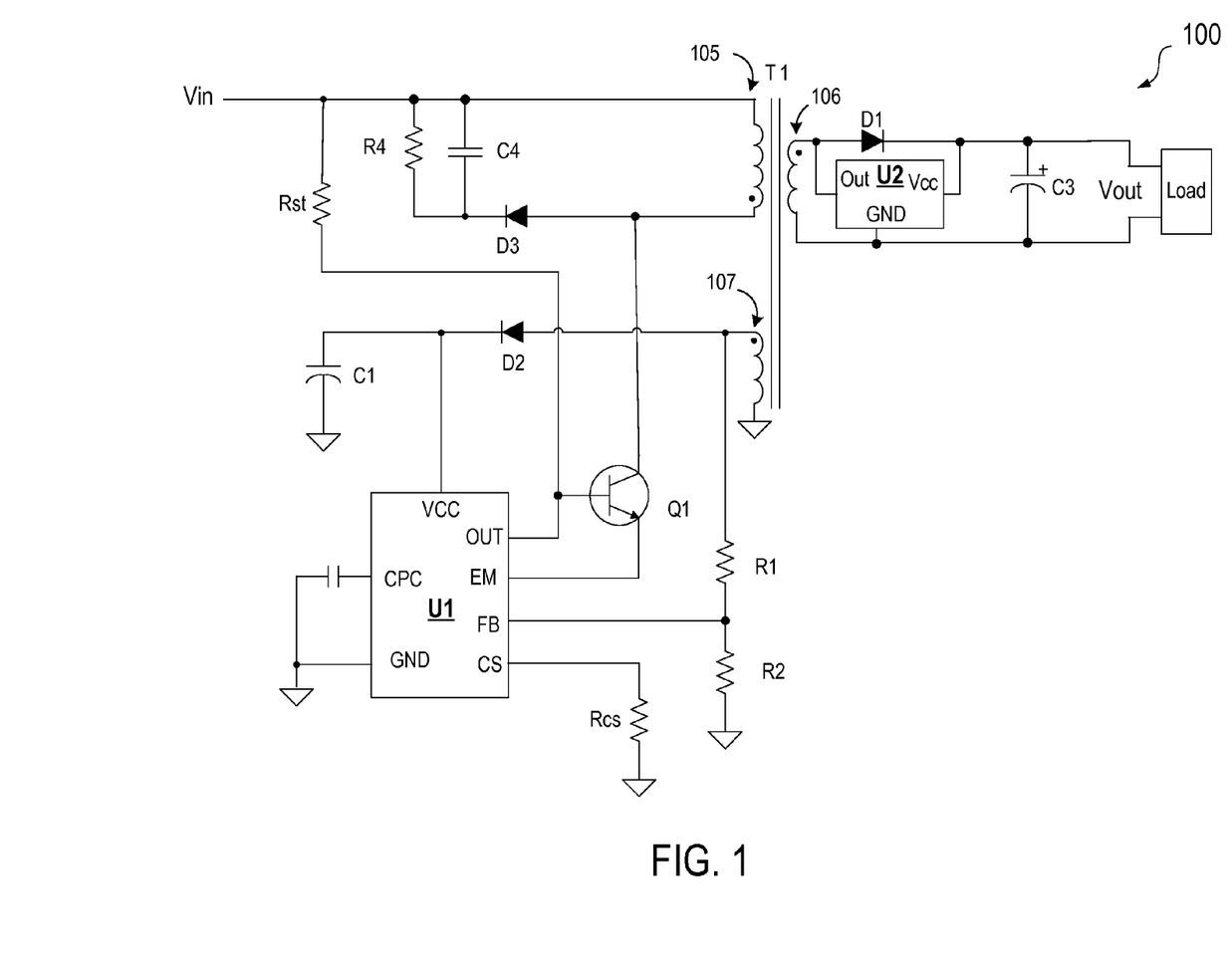
FIG. 1 is a simplified block diagram illustrating a switch mode power supply (SMPS) with low standby power according to an embodiment of the invention.

FIG. 1 is a simplified block diagram illustrating a switch mode power supply (SMPS) with low standby power according to an embodiment of the invention. As shown in FIG. 1, SMPS 100 includes a transformer T1 that has a primary winding 105, a secondary winding 106 and an auxiliary winding 107. SMPS 100 has a DC input voltage Vin. The output of the power supply Vout is provided by secondary winding 106 and a rectifying circuit including diode D1 and capacitor C3.

As shown in FIG. 1, SMPS 100 also includes a is a primary side controller U1, which has a power supply terminal VCC, a ground terminal GND, a feedback terminal FB, an output terminal OUT, and a current sense terminal CS. In some embodiments, e.g., as shown in FIG. 1, controller U1 can also have an EM terminal for connecting to the emitter of power switch Q1 and a CPC terminal for output cable compensation, which can be coupled to an external capacitor. Depending on the application, controller U1 can be a PFM controller or a PWM controller.

In primary side controller U1, current sense terminal CS is coupled to a resistor Rcs to sense a primary current flowing through primary winding 105 and bipolar power transistor Q1. In some embodiments that have the EM terminal, the CS terminal and the EM terminal are coupled inside controller U1 through another transistor. Controller U1 is configured to deliver a control pulse signal at output terminal OUT to turn on and off bipolar transistor Q1 to control the primary current. Currents are induced in the auxiliary and secondary windings when transistor Q1 is turned on and off. Resistors R1 and R2 form a voltage divider for sensing the current in the auxiliary winding. The voltage at the voltage divider is representative of output voltage Vout and is fed back to controller U1 at input terminal FB for further processing.

The output voltage Vout delivered to the output load is regulated by a control block in controller U1, which receives a current signal from a current sense resistor Rcs and a feedback voltage signal FB from resistors R1 and R2. The average value of Vout can thus be controlled by the feedback loop formed by the controller U1, power switch Q1, and the transformer.

While in the normal operation mode, auxiliary winging 107 supplies power to controller U1 via a rectifier diode D2. At start up, the rectified DC input voltage Vin supplies power to a control terminal of the power transistor, e.g., the base terminal of bipolar power transistor Q1, through a startup resistor Rst. With a current from the primary winding amplified by transistor Q1, controller U1 starts to work and outputs the switching control signals to drive power transistor Q1. An RCD (Resistor-Capacitor-Diode) buffer circuit is formed by a diode D3, a capacitor C4, and a resistor R4. The RCD buffer is configured to absorb the high voltage spikes caused by the leakage inductance of transformer T1 and prevents power transistor Q1 being broken down.

Current sense resistor Rcs is disposed between the emitter of Q1 and ground and is used for sensing the primary side peak current. The voltage divider resistors R1 and R2 are connected to the FB pin of controller U1 to provide the feedback signal. Controller U1 uses the feedback signal FB and the current sense signal CS to control the maximum output power by adjusting the frequency or duty cycle of the switching control signal.

According to embodiments of the invention, the standby power consumption of SMPS 100 under the no load condition is consumed by the following components:
(1) The startup resistor Rst,
(2) The primary side controller U1,
(3) Rectifier diodes D1 and D2,
(4) The magnetic flux of transformer T1, and
(5) The leakage inductance of transformer T1.
Each of the power consumed in these components is described in more detail below.

The Startup Resistor Rst

Usually Vin voltage is over ten times of the VCC voltage in controller U1. So the voltage across Rst almost equals to Vin.

$$P_{Rst} \approx \frac{V_{in}^2}{R_{st}}$$

where Vin is the system line voltage, and Rst is the startup resistance.

The Primary Side Controller U1

$$P_{U1} = V_{CC} \times \left( I_{CC\_Toff} \times \frac{T_{off}}{T_{SW}} + I_{CC\_Tons} \times \frac{T_{ons}}{T_{SW}} + I_{CC\_Tonp} \times \frac{T_{onp}}{T_{SW}} \right)$$

Where Pu1 is the power consumption of controller U1, and VCC is the power supply of the primary side controller U1. In normal working mode, a switching period can be divided into three sections. The first section is the on time of power transistor Q1, which is designated as the primary side turn-on time (Tonp), which can be expressed as $$T_{onp} = L_p \times \frac{I_p}{V_{in}},$$

where, $L_p$ is the transformer primary side inductance, and $I_p$ is the primary side peak current. During this section, the current flowing through the VCC terminal of controller U1 is $I_{CC\_Tonp}$. The second section starts after Q1 turns off, and the second side circuit turns on and outputs current to the output terminal. This section is designated the second side turn-on time (Tons), which can be expressed as $$T_{ons} = N_{ps} \times L_s \times \frac{I_p}{V_s},$$

where $N_{ps}$ is the winding ratio of the primary side to the second side, $L_s$ is the second side inductance, and $V_s$ is the second side voltage. Note that $V_s = V_{out} + V_D$, where $V_{out}$ is the system output voltage, and $V_D$ is the forward voltage of the diode D1. During this section, the current flowing through the VCC terminal of controller U1 is $I_{CC\_Tons}$. The third section is designated as $T_{off}$. During this section, Q1 turns off, and the second side current is zero. The current flowing through the VCC terminal of controller U1 is $I_{CC\_Toff}$. The system switching period $T_{SW}$ can be expressed as $T_{SW} = T_{onp} + T_{ons} + T_{off}$.

Rectifier Diodes D1 and D2

$$P_D = \frac{t_r}{T_{SW}} \times \int_0^{t_r} V_d \times I_d \, dt \text{ or } P_D = F_{SW} \times t_r \times \int_0^{t_r} V_d \times I_d \, dt$$

where $F_{SW}$ is the system switching frequency, $t_r$ is the recovery time of diode, $V_d$ is the voltage across diode, and $I_d$ is the current flowing through the diode.

The Magnetic Flux of Transformer T1

$$P_{tr} = K \times F_{SW} \times V \times B_m$$

where $B_m$ is the intensity of magnetic flux, V is the magnetic core volume, and K is a constant value.

The Leakage Inductance of Transformer T1

$$P_L = \frac{1}{2} \times F_{SW} \times L_t \times I_P^2$$

where $L_t$ is the primary side leakage inductance of the transformer. Resistor R4 consumes the energy generated by the primary side leakage inductance.

From the above analysis, it can be seen that the system switching frequency $F_{SW}$ influences power consumption of the primary side controller U1, the rectifier diodes D1 and D2, the magnetic flux, and the leakage inductance of transformer T1. Further, the lower the switching frequency, the smaller the power consumption. When the switching frequency decreases to some value, the above power consumption influenced by $F_{SW}$ will become a small portion of the total power consumption. Under this condition, the main power consumption is not a sensitive function of the switching frequency, including the power consumption on Rst and the quiescent power consumption of U1. Therefore, in embodiments of the invention, the switching frequency is lowered in power saving mode.

For the power consumption of Rst, since line voltage $V_{in}$ is already known, increasing Rst can lower the power consumption. However, increasing Rst will increase the system startup time.

In conventional controllers, every circuit block is operating at no load condition. Therefore, quiescent current and quiescent power consumption can be quite high. The large quiescent current causes the period $T_{off}$ to be short Under the no load condition, $T_{off}$ is determined by the VCC falling time to a pre-set under voltage detection reference voltage, referred to as the UVLO voltage herein. If VCC of U1 falls to UVLO, the system will re-startup. The VCC falling time to UVLO is determined by the quiescent current of controller U1 and VCC capacitor C1. In embodiments of the invention, the quiescent current of U1 is lowered, and $T_{off}$ will be longer. As a result, switching period $T_{SW}$ will also be longer, and the switching frequency is reduced. So decreasing the quiescent current of U1 not only can decrease the quiescent power consumption of U1, but also can increase the switching period, which will decrease the power consumption influenced by $T_{SW}$.

Embodiments of the invention also provide techniques for decreasing the power consumption of startup resistor Rst and controller U1, thus reducing the overall standby power of the power supply system towards the goal of "zero standby power", which, according to the definition of IEC 62301, is defined as a standby power consumption of less than 5 mW. In embodiments of the invention, the primary side controller U1 and secondary side controller U2 are configured to provide specific power saving functions.

As shown in FIG. 1, primary side controller U1 outputs driving signals to bipolar power transistor Q1. Secondary side controller U2 monitors the output voltage and outputs a pulse signal to the second side inductor to control the output voltage accurately.

Primary side controller U1 is configured to detect the load condition. In one embodiment, this detection is achieved using the feedback signal FB received at the FB terminal. Once a no load condition is detected, U1 enters a standby mode. In the standby mode, most of the circuits and functions in U1 are shut down. Only an awakening signal detector remains functional. The awakening signal detector is configured to consume little current. The awakening signal detector detects the awakening signal transferred by secondary controller U2 through transformer T1. Once the awakening signal is detected, controller U1 outputs an 'on' pulse at the OUT terminal to drive power transistor Q1. If controller U1 detects two successive awakening signals, controller U1 exits the standby mode and enters the normal working mode. In normal working mode, all the functional blocks in controller U1 are turned on and work normally. If two successive awakening signals are not detected in a certain period of time, after detecting one awakening signal, controller U1 stays in the standby mode.

In embodiments of the invention, primary controller U1 consumes little current in the standby mode. In some embodiments, the current consumption can be in the range of tens of microamperes. Such low current consumption leads to low system switching frequency. For no load condition, VCC is also low (<10V). So the power consumed by U1 can be lower than 1 mW. In contrast, in normal working mode, primary side controller U1 can consume a current of hundreds of microamperes or even larger.

Figure 2:
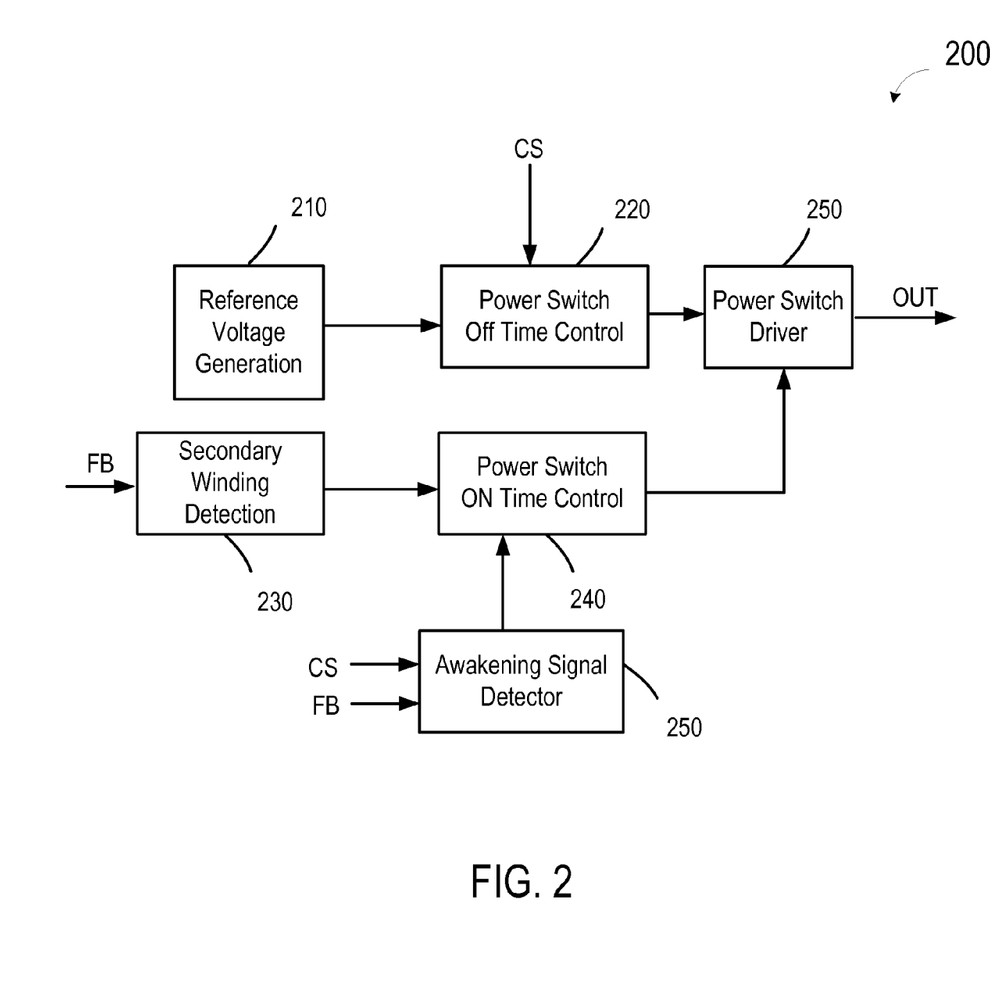
FIG. 2 is a simplified block diagram of a primary side controller for SMPS 100 of FIG. 1 according to an embodiment of the invention.

FIG. 2 is a simplified block diagram of a primary side controller 200, which can be used as controller U1 for the SMPS 100 of FIG. 1 according to an embodiment of the invention. As shown in FIG. 2, reference voltage generation circuit 210 is configured to provide a DC reference voltage, which is used to control the peak current through the power switch. Power switch off time control circuit 220 is coupled to reference voltage generation circuit 210 and the input from the CS (current sense) terminal. When the voltage at the CS terminal reaches the above-mentioned reference voltage, the current in the primary winding is turned off. Secondary winding detection circuit 230 receives the feedback signal from the FB terminal to produce a voltage signal that reflects the current conduction in the secondary rectifying circuit. Power switch on time control circuit 240 determines the power switch on time based on charging a capacitor using a first current source and discharging the capacitor using a second current source. Power switch driver circuit 250 receives control signals from power switch off time control circuit 220 and power switch on time control circuit 240 and provides a control signal OUT to the power transistor to turn the power transistor on and off. In constant-current mode, the ratio of the on time and off time is maintained at a constant.

As described above, when an awakening signal is induced in the auxiliary winding, the primary side control circuit provides a turn-on signal to the power transistor. Further, the primary side control circuit U1 is configured to be in a standby mode under a no-load condition, in which one or more circuit blocks in the primary side control circuit are turned off, and the primary-side control circuit U1 enters into a normal operating mode when two successive awakening signals are received within a predetermined time period. As shown in FIG. 2, primary side controller 200 includes an awakening signal detector 250, which receives inputs from the CS and FB terminals and is coupled to power switch on time control circuit 240. Awakening signal detector 250 is coupled to the feedback terminal and configured to detect the awakening signal. Awakening signal detector 250 is configured to operate in the standby mode and is configured to provide the turn-on signal to the power transistor upon receiving the awakening signal. In some embodiments, in the standby mode, all circuit blocks in the primary side control circuit are turned off except the awakening signal detector.

In embodiments of the invention, awakening signal detector 250 is configured to detect a ringing waveform induced in the auxiliary winding as a result of secondary control circuit U2 providing a pulse signal in the secondary winding when a low voltage condition is detected. In an embodiment, awakening signal detector 250 is configured to blank the output of the ringing waveform detection circuit (e.g. using a comparator) for an initial time interval (e.g. 100 us). After the blanking time interval, awakening signal detector 250 will activate the output of the ringing waveform detection circuit, and can detect the awakening signal, e.g., using a comparator.

In some embodiments, in standby mode, the main power control logic (PFM or PWM) operates at a low clock frequency to save power, and awakening signal detector 250 operates asynchronously to detect the ringing waveform of the awakening signal caused by a drop in the output voltage before the main control logic can detect this condition. Once detected, awakening signal detector 250 triggers the main control logic to issue a turn-on signal to the power transistor.

In a specific embodiment, ringing waveforms is detected by a comparator, and after a blanking time (e.g., 100 us), an RS flip-flop will be set to turn on the power transistor. The RS flip-flop will be reset to turn off the power switch when the CS voltage is greater than a pre-defined voltage (0.5V, for example).

As shown in FIG. 1, in some embodiments, SMPS 100 further includes an output diode D1 and an output capacitor C3 coupled to the secondary winding and the output terminals of the SMPS. The secondary side control circuit U2 includes a first terminal Out coupled to a first terminal of the secondary winding, a second terminal VCC coupled to the output capacitor and the output terminal of the SMPS, and a third terminal GND coupled to a second terminal of the secondary winding. The output diode D1 is coupled between the first terminal Out and the third terminal VCC of the secondary side control circuit.

Figure 3:
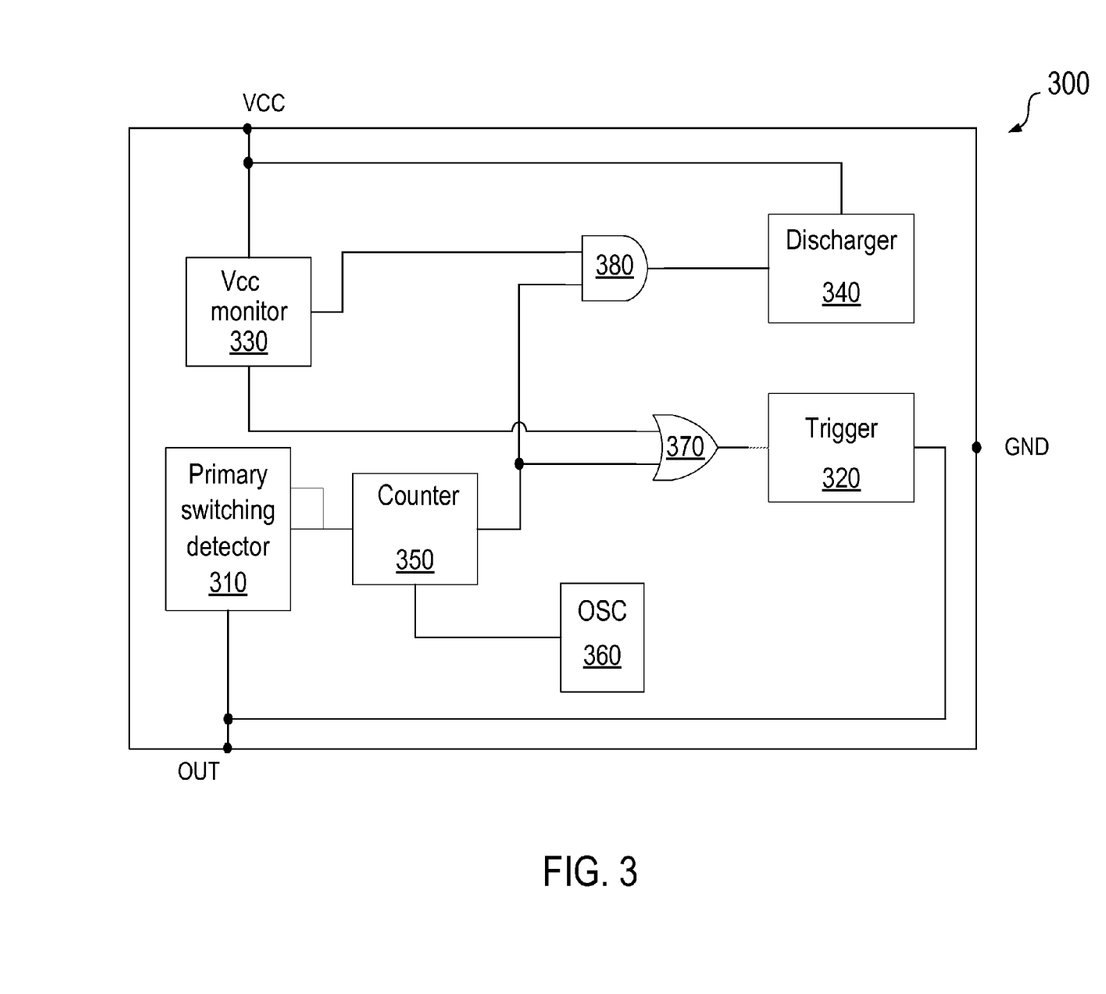
FIG. 3 is a simplified block diagram of a secondary side controller for SMPS 100 of FIG. 1 according to an embodiment of the invention.

FIG. 3 is a simplified block diagram of a secondary side controller 300 for the SMPS 100 of FIG. 1 according to an embodiment of the invention. In the embodiment shown in FIG. 3, secondary control circuit 300 includes a switching detector circuit 310 coupled to the first terminal OUT for detecting a state of the secondary winding, a trigger circuit 320 coupled to the first terminal OUT for providing the first electrical signal to be received as the awakening signal by the primary side control circuit, an output monitor 330 coupled to the second terminal VCC for monitoring the output of the SMPS, and a discharge circuit 340 for discharging the output capacitor. In some embodiments of the SMPS, the secondary side control circuit is configured to control the output voltage by providing the first electrical signal to the secondary winding when the output voltage is less than the first reference voltage and discharging an output capacitor when the output voltage is higher than a second reference voltage. Secondary side control circuit 300 also includes other supporting circuit blocks or components such as counter 350, oscillator 360, and logic gates 370 and 380.

In the standby mode, secondary side controller U2 still works normally. It monitors the system output voltage. If the system output voltage is lower than a reference value, U2 outputs the awakening signal to controller U1 through transformer T1. In response, primary side controller U1 will issue an ON signal to power transistor Q1 to supply more current. If the system output voltage is higher than another reference value, U2 discharges the output capacitor C3. In some embodiments, secondary side controller U2 is configured to maintain the system output voltage in a range of ±5% of nominal value.

In standby mode, the system switching frequency is determined by the internal clock of secondary side controller U2. The system switching frequency is designed according to the standby power and system components parameters. For sub-5 mW standby power, the system switching frequency usually is configured to be between 10 Hz and 20 Hz. For such low switching frequency, the power consumption that is influenced by the switching frequency is very small.

When the load changes suddenly, secondary side controller U2 detects the changes. If the load changes from no load to heavy load suddenly, the system output will drop. When the system output voltage drops below a fixed lower limit voltage, secondary controller U2 sends out an awakening signal. If primary controller U1 detects two successive awakening signals in a fixed period, U1 will exits the standby mode and enters the normal working mode. In normal working mode, the system switching frequency changes according to the load condition. Because the time interval between the two successive awakening signals is short, the system can respond rapidly when the load changes. Thus, the system has good undershoot performance. If the load changes from heavy load to no load suddenly, the system output voltage will rise. When the system output voltage reaches higher than a fixed upper limit voltage, U2 discharges the output capacitor. As a result, the system also has good overshoot performance.

Some embodiments of the invention achieve zero standby power through the following actions.

(1) Lower the switching frequency and cut down the current of U1 during standby mode.

During $T_{off}$, most of the circuits and functions are shut down. Only the awakening signal detector is still operating. Thus, most of the U1 current consumption can be reduced, and the switching frequency can be very low in standby mode. From the above description, when the switching frequency is low, the power consumption components influenced by the switching frequency is also decreased. For the fixed application system, $T_{onp}$ and $T_{ons}$ are fixed. If the switching frequency is very low, $T_{off}$ is approximate to $T_{SW}$. In one switching period, the U1 power consumption is $$P_{U1'} = V_{CC} \times \left( I_{CC\_Toff} \times \frac{T_{off}}{T_{SW}} + I_{CC\_Tons} \times \frac{T_{ons}}{T_{SW}} + I_{CC\_Tonp} \times \frac{T_{onp}}{T_{SW}} \right)$$
$$\approx V_{CC} \times I_{CC\_Toff}$$

From the above equation, we can see, low $I_{CC\_Toff}$ causes low $P_{U1'}$. For example, $P_{U1'}$ can be less than 1 mW.

(2) Lower the power consumption of startup resistor Rst

During system starts up, Q1 acts as the startup current amplifier. As a result, the startup current can be much larger than the startup current provided through a startup resistor in a conventional system. In some cases, amplified startup current can be over ten times that of the traditional startup current, while a small current is maintained in Rst. Therefore, in embodiments of the invention, the same startup speed can be achieved with a startup resistance that can be over ten times of the traditional startup resistor. Thus, the power consumption of Rst can be over ten times lower. In a specific embodiment, using this startup circuit, the power consumption of Rst is approximately 1.5 mW.

(3) Using the second side controller to monitor the output voltage and provide the system switching frequency during no load mode.

The output voltage variation can be controlled in ±5%. And the system has good dynamic performance with the second side controller. Of course, the second side controller consumes some power. In a switching period, the power consumption of U2 is, $$P_{U2} = V_{out} \times I_{U2}$$

where, $V_{out}$ is the system output voltage, which also supplies U2. $I_{U2}$ is the current consumption of U2. In some embodiments, $V_{out}$ is around 5V and $I_{U2}$ is tens of microamperes. From the above equation, the power consumption of the second side controller is approximately 0.5 mW.

Because of the extremely low switching frequency, the power consumption from other components influenced by frequency can be less than 1 mW. So the total system power consumption can be less than 5 mW during no load mode in embodiments of the invention.

The above description is intended to be illustrative and not restrictive. Many variations of the invention will become apparent to those skilled in the art upon review of this disclosure. The scope of the invention should, therefore, not be limited the above description.

What is claimed is:

1. A switching mode power supply (SMPS), comprising:
   a transformer having:
      a primary winding for coupling to an input power source;
      a secondary winding for providing an output of the SMPS; and
      an auxiliary winding;
   a power transistor coupled to the primary winding;
   a resistor coupled between the input power source and a control terminal of the power transistor for triggering a primary current flow through the power transistor for providing startup power;
   a primary side control circuit coupled to the auxiliary winding and the power transistor, the primary side control circuit being configured to regulate the output of the SMPS by controlling the power switch in response to a feedback voltage signal that is representative of the output of the SMPS; and
   a secondary side control circuit coupled to the secondary winding and being configured to provide a first electrical signal to the secondary winding when an output voltage of the SMPS is less than a first reference voltage, whereupon an awakening signal is induced in the auxiliary winding and causes the primary side control circuit to provide a turn-on signal to the power transistor;
   wherein the primary side control circuit is configured to be in a standby mode under a no-load condition, in which one or more circuit blocks in the primary side control circuit are turned off, and the primary-side control circuit enters into a normal operating mode when two successive awakening signals are received within a predetermined time period.

2. The switching mode power supply of claim 1, wherein the primary side control circuit comprises a pulse frequency modulation (PFM) controller.

3. The switching mode power supply of claim 1, wherein the secondary side control circuit is configured to control the output voltage by:
providing the first electrical signal to the secondary winding when the output voltage is less than the first reference voltage; and
discharging an output capacitor when the output voltage is higher than a second reference voltage.

4. The switching mode power supply of claim 1, wherein a system switching frequency is between 10 Hz and 20 Hz in the standby mode.

5. The switching mode power supply of claim 1, wherein the secondary control circuit is characterized by a power consumption of 0.5 mWatt to 1 mWatt in a switching period.

6. The switching mode power supply of claim 1, wherein the primary side control circuit is characterized by a standby mode power consumption of not more than 1 mWatt in a switching period.

7. The switching mode power supply of claim 1, wherein the SMPS is characterized by a standby mode power consumption of not more than 5 mWatt in a switching period.

8. The switching mode power supply of claim 1, wherein the primary side control circuit comprises an awakening signal detector that is configured to operate in the standby mode and is configured to provide the turn-on signal to the power transistor upon receiving the awakening signal.

9. The switching mode power supply of claim 8, wherein, in the standby mode, all circuit blocks in the primary side control circuit are turned off except the awakening signal detector.

10. The switching mode power supply of claim 1, wherein the primary side control circuit is configured to operate at a first frequency in the normal operating mode and is configured to operate at a second frequency in the standby mode, wherein the second frequency is lower than the first frequency.

11. The switching mode power supply of claim 10, wherein the first frequency is approximately 50 KHz and the second frequency is approximately 20 Hz.

12. The switching mode power supply of claim 1, wherein the SMPS further comprises an output diode and an output capacitor coupled to the secondary winding and the output terminals of the SMPS;
wherein the secondary side control circuit comprises:
a first terminal coupled to a first terminal of the secondary winding;
a second terminal coupled to the output capacitor and the output terminal of the SMPS; and
a third terminal coupled to a second terminal of the secondary winding;
wherein the output diode is coupled between the first and the second terminals of the secondary side control circuit.

13. The switching mode power supply of claim 12, wherein the secondary side control circuit further comprises:
a switching detector circuit coupled to the first terminal for detecting a state of the secondary winding;
a trigger circuit coupled to the first terminal for providing the first electrical signal to be received as the awakening signal by the primary side control circuit;
an output monitor coupled to the second terminal for monitoring the output of the SMPS; and
a discharge circuit for discharging the output capacitor.

14. The switching mode power supply of claim 1, further comprising a buffer circuit with a first terminal coupled to the input voltage source and a second terminal coupled to the primary winding and the power transistor.

15. The switching mode power supply of claim 14, wherein the buffer circuit further comprises:
a resistor and a capacitor connected in parallel between the input voltage source and a first terminal of the primary winding; and
a diode coupled between the parallelly-connected resistor and capacitor and a second terminal of the primary winding.

16. A switching mode power supply (SMPS), comprising:
a transformer having:
a primary winding for coupling to an input power source;
a secondary winding for providing an output of the SMPS; and
an auxiliary winding;
a power transistor coupled to the primary winding;
a resistor coupled between the input power source and a control terminal of the power transistor for triggering a primary current flow through the power transistor for providing startup power;
a primary side control circuit coupled to the auxiliary winding and the power transistor, the primary side control circuit being configured to regulate the output of the SMPS by controlling the power switch in response to a feedback voltage signal that is representative of the output of the SMPS; and
a secondary side control circuit coupled to the secondary winding and being configured to provide a first electrical signal to the secondary winding when an output voltage of the SMPS is less than a first reference voltage, whereupon an awakening signal is induced in the auxiliary winding and causes the primary side control circuit to provide a turn-on signal to the power transistor.

17. The switching mode power supply of claim 16, wherein, in the standby mode, all circuit blocks in the primary side control circuit are turned off except the awakening signal detector.

18. The switching mode power supply of claim 16, wherein the secondary side control circuit is configured to control the output voltage by:
providing the first electrical signal to the secondary winding when the output voltage is less than the first reference voltage; and
discharging an output capacitor when the output voltage is higher than a second reference voltage.

19. The switching mode power supply of claim 16, wherein the primary side control circuit is configured to enter into a standby mode under a no-load condition, in which one or more circuit blocks in the primary side controller are turned off, and the primary side control circuit enters into a normal operating mode when two successive awakening signals are received within a predetermined time period.

20. The switching mode power supply of claim 19, wherein the primary side control circuit comprises an awakening signal detector that is configured to operate in the standby mode and is configured to provide the turn-on signal to the power transistor upon receiving the awakening signal.

* * * * *